(12) United States Patent
Kobayashi et al.

(10) Patent No.: US 10,663,121 B2
(45) Date of Patent: May 26, 2020

(54) LIGHT-EMITTING DEVICE, LIGHT SOURCE UNIT, AND PROJECTION DISPLAY APPARATUS

(71) Applicant: SONY CORPORATION, Tokyo (JP)

(72) Inventors: Izushi Kobayashi, Tokyo (JP); Hiroki Morita, Kanagawa (JP); Yoshiro Asano, Kanagawa (JP); Yuki Maeda, Kanagawa (JP); Shinichiro Tajiri, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/087,311

(22) PCT Filed: Mar. 9, 2017

(86) PCT No.: PCT/JP2017/009478
§ 371 (c)(1),
(2) Date: Sep. 21, 2018

(87) PCT Pub. No.: WO2017/169628
PCT Pub. Date: Oct. 5, 2017

(65) Prior Publication Data
US 2019/0072245 A1 Mar. 7, 2019

(30) Foreign Application Priority Data

Mar. 30, 2016 (JP) .................................. 2016-068577
Nov. 29, 2016 (JP) .................................. 2016-231371

(51) Int. Cl.
*F21S 2/00* (2016.01)
*F21V 7/24* (2018.01)
(Continued)

(52) U.S. Cl.
CPC ............... *F21S 2/005* (2013.01); *C09K 11/02* (2013.01); *F21V 7/24* (2018.02); *F21V 7/28* (2018.02);
(Continued)

(58) Field of Classification Search
CPC .... F21S 2/005; F21V 7/30; F21V 7/28; F21V 7/24; G03B 21/204; G03B 21/14; H04N 5/74; F21Y 2115/10; F21Y 2115/30
See application file for complete search history.

(56) References Cited

U.S. PATENT DOCUMENTS 9,365,766 B2 * 6/2016 Huang ..................... F21S 8/026
9,394,478 B2 * 7/2016 Inamura ............. C09K 11/7731
(Continued)

FOREIGN PATENT DOCUMENTS

CN 1638166 A 7/2005
EP 2645433 A2 10/2013
(Continued)

OTHER PUBLICATIONS

WO2017169628—isR_Machine Translation (Year: 2018).*
(Continued)

*Primary Examiner* — Tracie Y Green
(74) *Attorney, Agent, or Firm* — Chip Law Group

(57) ABSTRACT

A light-emitting device of an embodiment of the present disclosure includes a first base, a second base that is disposed to face the first base, and a phosphor layer that is provided to be filled with a plurality of phosphor particles between the first base and the second base.

16 Claims, 9 Drawing Sheets

(51) Int. Cl.
  *F21V 7/28*   (2018.01)
  *G03B 21/20*  (2006.01)
  *H04N 5/74*   (2006.01)
  *F21V 7/30*   (2018.01)
  *H04N 9/31*   (2006.01)
  *C09K 11/02*  (2006.01)
  *F21Y 115/30* (2016.01)
  *F21Y 115/10* (2016.01)

(52) U.S. Cl.
  CPC .............. *F21V 7/30* (2018.02); *G03B 21/204* (2013.01); *H04N 5/74* (2013.01); *H04N 9/3105* (2013.01); *H04N 9/3158* (2013.01); *H04N 9/3161* (2013.01); *H04N 9/3164* (2013.01); *F21Y 2115/10* (2016.08); *F21Y 2115/30* (2016.08)

(56) References Cited

U.S. PATENT DOCUMENTS

| | | | |
|---|---|---|---|
| 10,094,529 B2* | 10/2018 | Nagasaki | B60Q 1/04 |
| 2006/0291226 A1 | 12/2006 | Daicho et al. | |
| 2012/0087124 A1 | 4/2012 | Ravillisetty et al. | |
| 2012/0200218 A1 | 8/2012 | Maemura et al. | |
| 2013/0257264 A1 | 10/2013 | Tamaki et al. | |

FOREIGN PATENT DOCUMENTS

| | | |
|---|---|---|
| JP | 2005-197476 A | 7/2005 |
| JP | 2010-085740 A | 4/2010 |
| JP | 2012-018209 A | 1/2012 |
| JP | 2012-162600 A | 8/2012 |
| JP | 2012-185402 A | 9/2012 |
| JP | 2012-255060 A | 12/2012 |
| JP | 2013-200393 A | 10/2013 |
| JP | 2013-203822 A | 10/2013 |
| JP | 2014-507755 A | 3/2014 |
| WO | 2012/092037 A1 | 7/2012 |

OTHER PUBLICATIONS

International Search Report and Written Opinion of PCT Application No. PCT/JP2017/009478, dated May 30, 2017, 12 pages of ISRWO.

* cited by examiner

[FIG. 1]
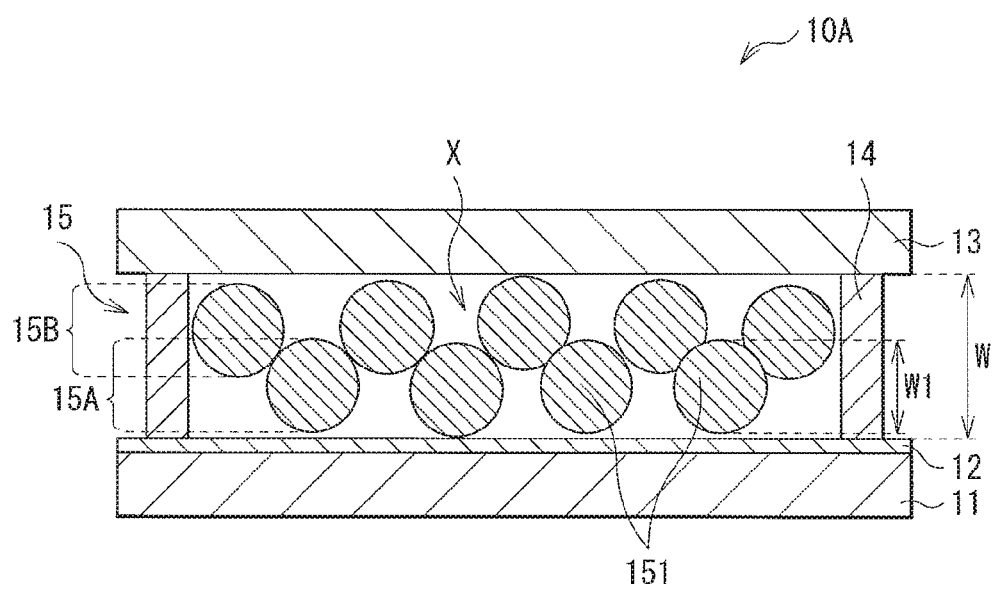
[FIG. 2]
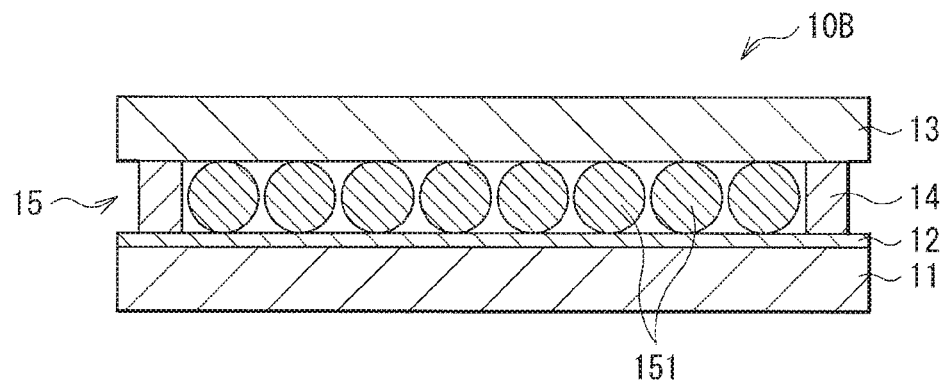

[ FIG. 3A ]
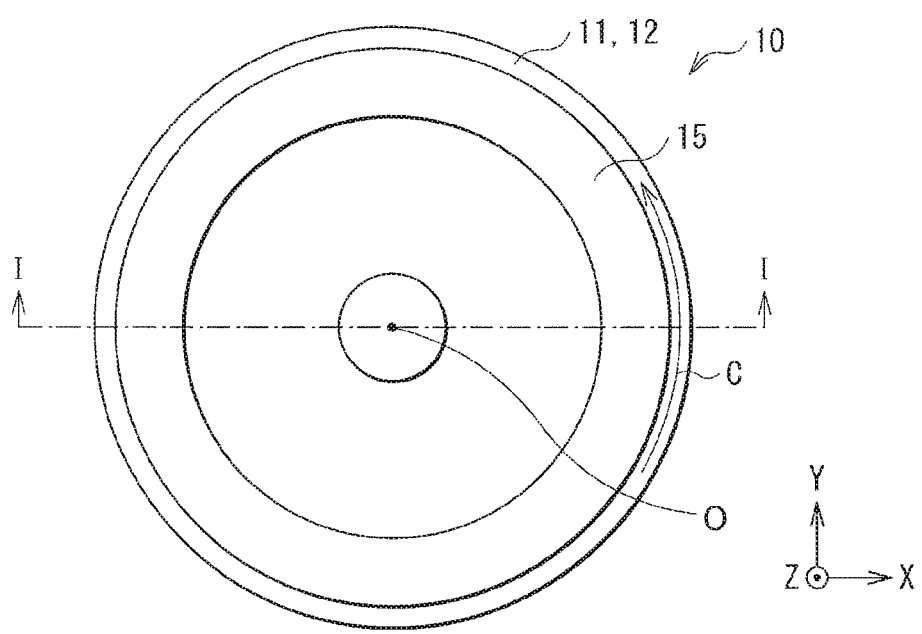
[ FIG. 3B ]
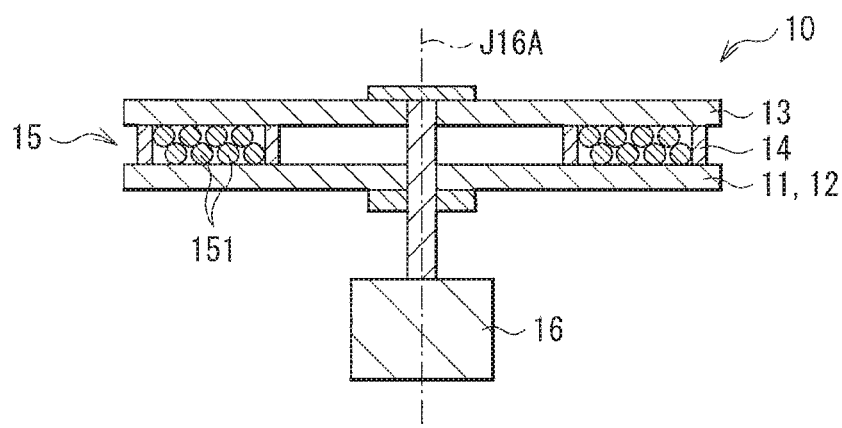

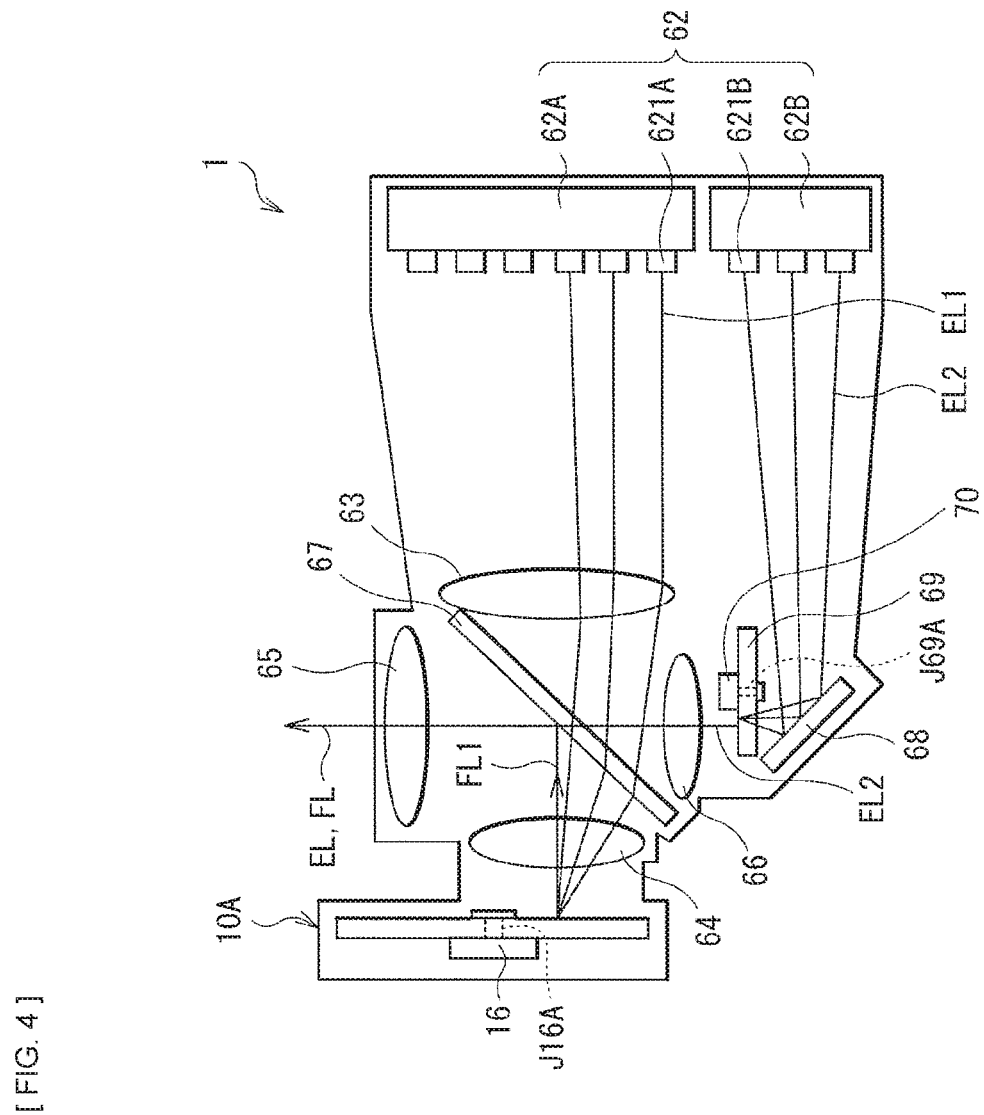
[FIG. 4]

[ FIG. 5 ]
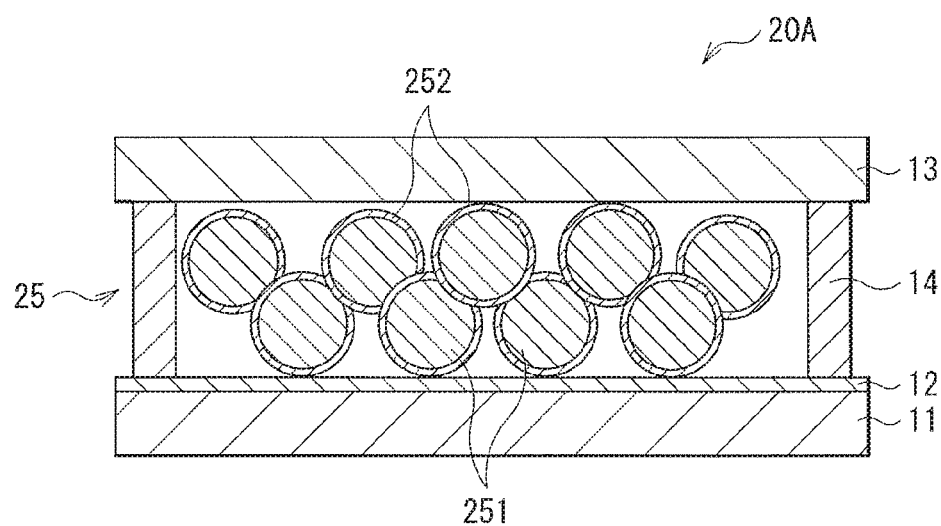
[ FIG. 6 ]
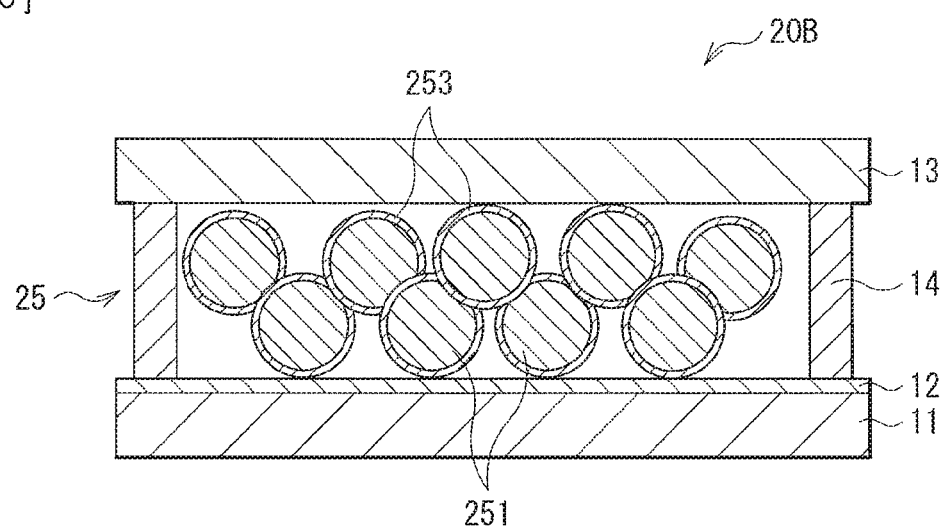

[ FIG. 7 ]
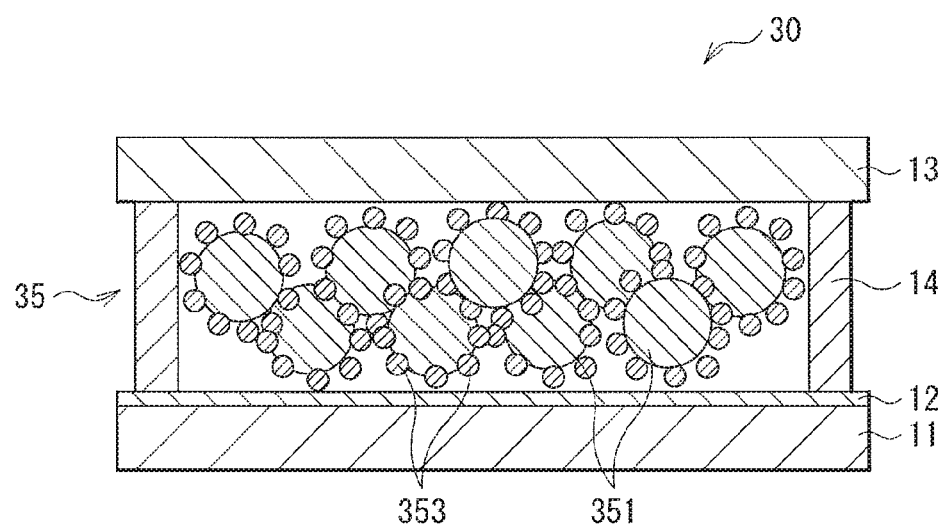
[ FIG. 8A ]
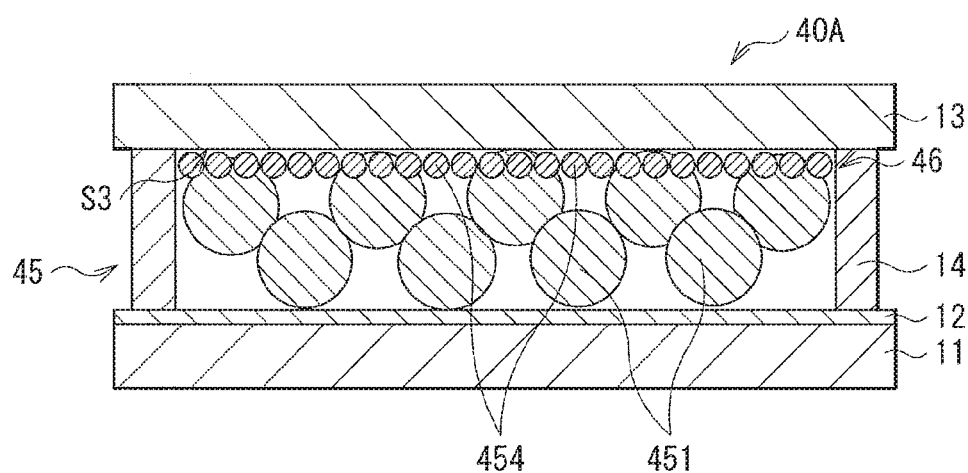

[FIG. 8B]
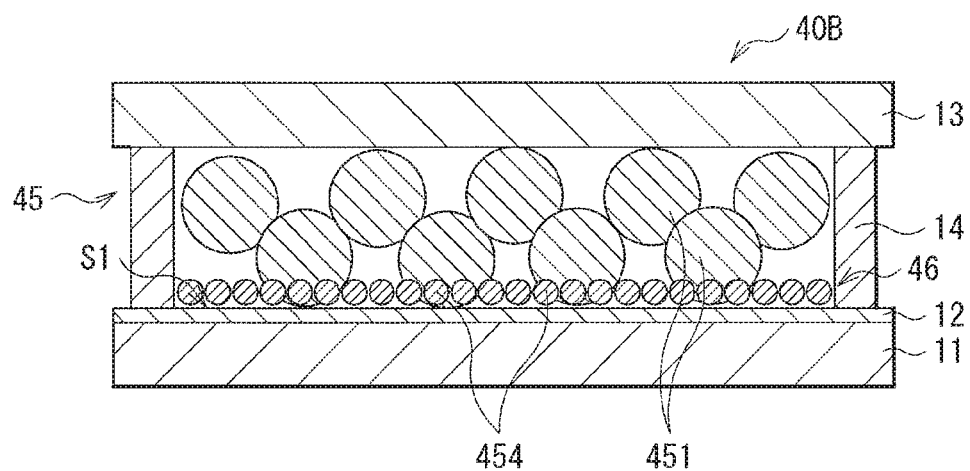
[FIG. 9]
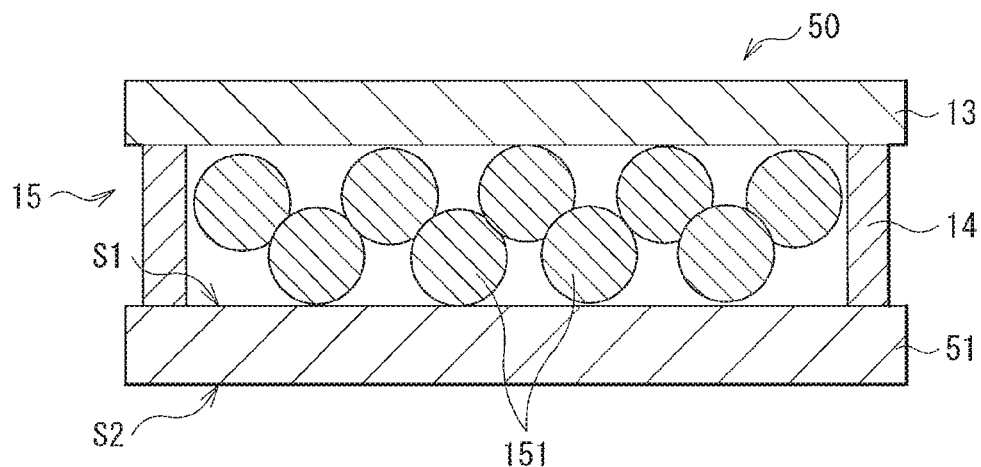

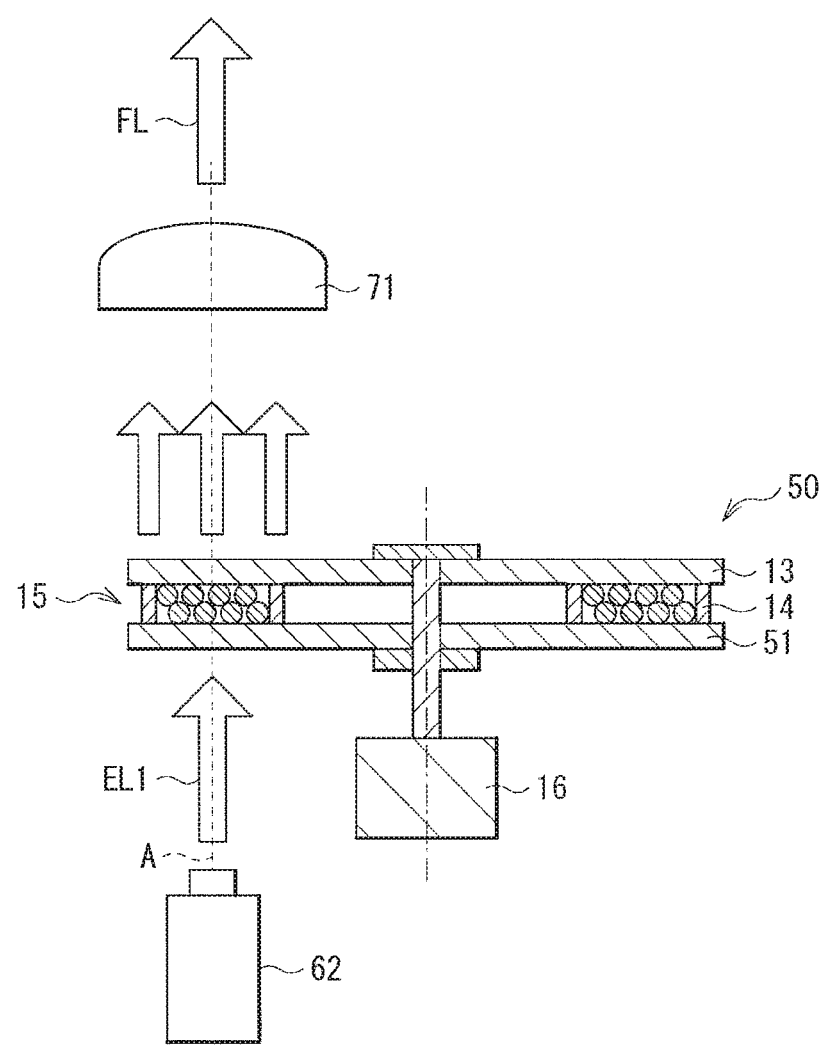
[ FIG. 10 ]

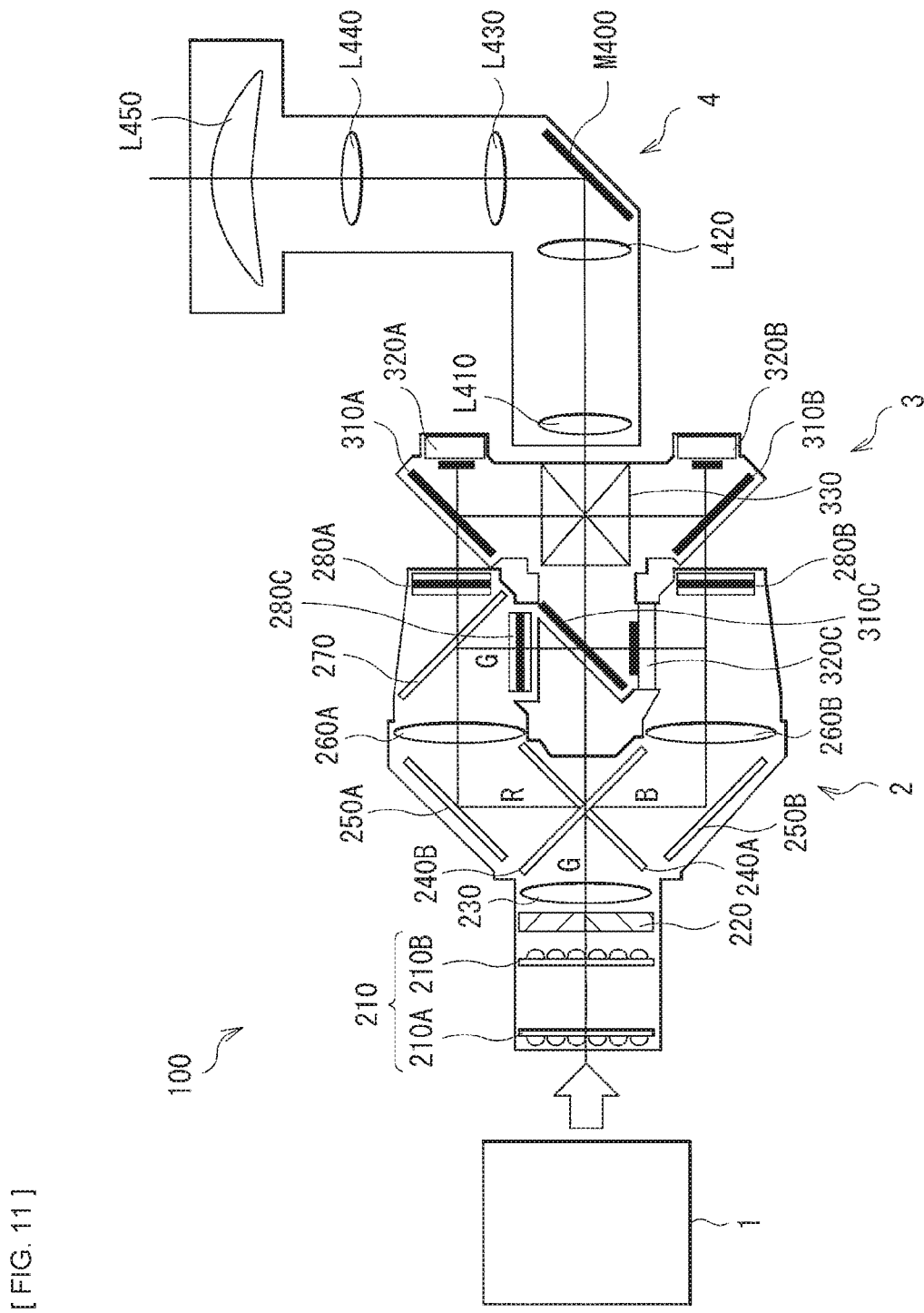
[ FIG. 11 ]

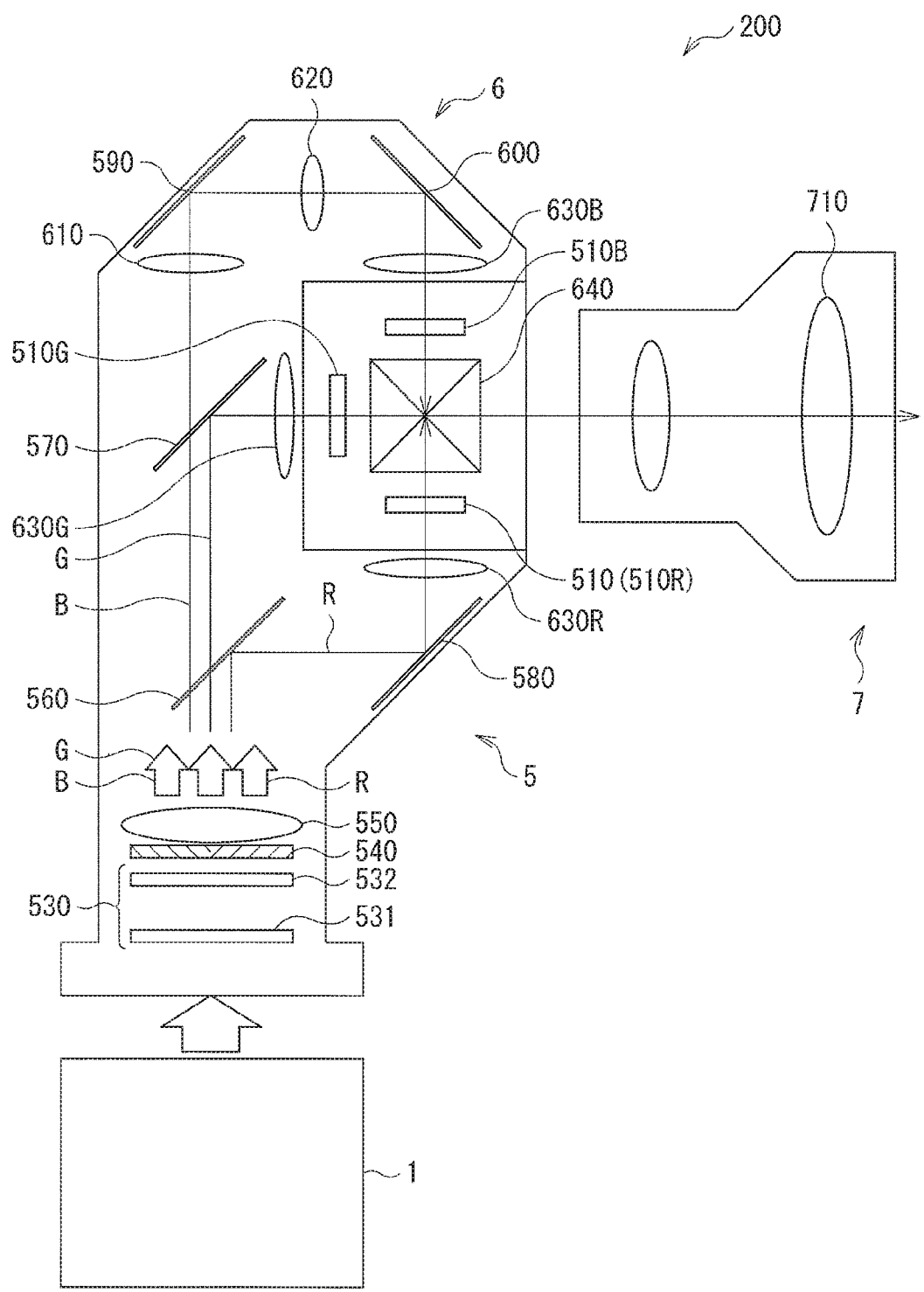
[ FIG. 12 ]

LIGHT-EMITTING DEVICE, LIGHT SOURCE UNIT, AND PROJECTION DISPLAY APPARATUS

CROSS REFERENCE TO RELATED APPLICATIONS

This application is a U.S. National Phase of International Patent Application No. PCT/JP2017/009478 filed on Mar. 9, 2017, which claims priority benefit of Japanese Patent Application No. JP 2016-068577 filed in the Japan Patent Office on Mar. 30, 2016 and also claims priority benefit of Japanese Patent Application No. JP 2016-231371 filed in the Japan Patent Office on Nov. 29, 2016. Each of the above-referenced applications is hereby incorporated herein by reference in its entirety.

TECHNICAL FIELD

The present disclosure relates to a light-emitting device, a light source unit, and a projection display apparatus that emit fluorescence.

BACKGROUND ART

A high-luminance discharge lamp has been the mainstream before as a light source unit used in projectors, etc. for a presentation or a digital cinema. However, in recent years, the number of products has been increased that adopt solid-state light-emitting devices such as light emitting diodes (LEDs) and laser diodes (LDs).

The light source unit adopting the solid-state light-emitting devices includes a configuration in which particulate phosphors are irradiated with light (excitation light) from, for example, the LEDs or the LDs, and thereby white color light as fluorescence is extracted. The particles of phosphor (phosphor particles) are generally fixed on a substrate as a phosphor layer that is mixed with a binder. In such a light source unit, the phosphor particles are dispersed in the binder, and thus, it is difficult to shorten the distance between the particles. Therefore, it is not possible to increase the filling rate of the particles per unit volume, and thus, it is difficult to improve the conversion efficiency to fluorescence. Further, such a phosphor layer has a large amount of light propagation in a surface direction. This causes the area of emitting light with respect to the area of being irradiated with the excitation light to become large, which leads to the reduction in light use efficiency. Furthermore, the fluorescence that has been converted by the phosphor particles is outputted to the outside via the binder. This causes the fluorescence to be absorbed within the binder, leading to the deterioration of light intensity.

To address this, for example, PTL 1 discloses a light-emitting device including a phosphor layer that allows a portion of the phosphor particles to be exposed from the binder. In such a light-emitting device, allowing the portion of the phosphor particles to be exposed from the binder leads to the reduction in light loss caused due to the propagation of the fluorescence in the binder.

CITATION LIST

Patent Literature

Patent Literature 1: Japanese Unexamined Patent Application Publication No. 2012-185402

SUMMARY OF THE INVENTION

However, further improvement of light conversion efficiency is demanded in a light source unit that uses a solid-state light-emitting device.

It is desirable to provide a light-emitting device, a light source unit, and a projection display apparatus that make it possible to improve light conversion efficiency.

A light-emitting device according to one embodiment of the present disclosure includes a first base, a second base disposed to face the first base, and a phosphor layer filled with a plurality of phosphor particles between the first base and the second base.

A light source unit according to one embodiment of the present disclosure includes a light source section and a light-emitting device that is excited by light derived from the light source section and emits fluorescence. The light-emitting device mounted to the light source unit includes the same constituent elements as those of the light-emitting device of one embodiment of the above-described present disclosure.

A projection display apparatus according to one embodiment of the present disclosure includes a light source optical system, an image generation optical system that modulates light derived from the light source optical system on the basis of an inputted image signal, and thereby generates image light, and a projection optical system that projects the image light that is generated at the image generation optical system. The light source optical system mounted to this projection display apparatus includes the same constituent elements as those of the light source unit of one embodiment of the above-described present disclosure.

In the light-emitting device, the light source unit, and the projection display apparatus according to the respective embodiments of the present disclosure, the second base is disposed on the first base to face each other, and a part between the first base and the second base is filled with the plurality of phosphor particles. This improves the filling rate of the phosphor particles in the phosphor layer.

According to the light-emitting device, the light source unit, and the projection display apparatus according to the respective embodiments of the present disclosure, the part between the first substrate and the second substrate is filled with the plurality of phosphor particles. The first substrate and the second substrate are disposed, as a pair, to face each other. This allows the phosphor layer having a high filling rate of the phosphor particles to be obtained, which makes it possible to improve the light conversion efficiency. It is to be noted that effects that are described here are not necessarily limitative and there may be any effect described in the disclosure.

BRIEF DESCRIPTION OF THE DRAWINGS

FIG. 1 is a cross-sectional view of an example of a light-emitting device according to a first embodiment of the present disclosure.

FIG. 2 is a cross-sectional view of another example of a light-emitting device according to the first embodiment of the present disclosure.

FIG. 3A is a plan view of an entire configuration of a light-emitting device illustrated in FIG. 1.

FIG. 3B is a cross-sectional view of the entire configuration of the light-emitting device illustrated in FIG. 1.

FIG. 4 is a schematic diagram illustrating a configuration example of a light source unit including the light-emitting device illustrated in FIG. 1.

FIG. 5 is a cross-sectional view of a light-emitting device according to a second embodiment of the present disclosure.

FIG. 6 is a cross-sectional view of a light-emitting device according to modification example 1 of the present disclosure.

FIG. 7 is a cross-sectional view of a light-emitting device according to a third embodiment of the present disclosure.

FIG. 8A is a cross-sectional view of an example of a light-emitting device according to a fourth embodiment of the present disclosure.

FIG. 8B is a cross-sectional view of another example of a light-emitting device according to the fourth embodiment of the present disclosure.

FIG. 9 is a cross-sectional view of a light-emitting device according to modification example 2 of the present disclosure.

FIG. 10 is a schematic view of a configuration example of a light-emitting unit including the light-emitting device illustrated in FIG. 9.

FIG. 11 is a schematic diagram illustrating an example of a configuration example of a projection display apparatus including the light source unit illustrated in FIG. 4.

FIG. 12 is a schematic diagram illustrating another example of the configuration example of the projection display apparatus including the light source unit illustrated in FIG. 4.

MODES FOR CARRYING OUT THE INVENTION

In the following, description will be given of embodiments of the present disclosure in detail with reference to the drawings. Incidentally, description will be made in the following order.
1. First Embodiment (Reflection type light-emitting device)
　1-1. Configuration of Light-Emitting Device
　1-2 Configuration of Phosphor Wheel
　1-3 Configuration of Light Source Unit
　1-4 Workings and Effects
2. Second Embodiment (An example of surfaces of phosphor particles each being covered by an optical thin film)
3. Modification Example 1 (An example of surfaces of phosphor particles each being covered by a crosslinking film)
4. Third Embodiment (An example of metal nano particles being disposed on surfaces of phosphor particles)
5. Fourth Embodiment (Examples of using nano phosphor particles along with phosphor particles
6. Modification Example 2 (Transmissive light-emitting device)
7. Application Examples (Projection display apparatus)

1. FIRST EMBODIMENT

FIG. 1 illustrates a cross-sectional configuration of a light-emitting device (light-emitting device 10A) according to a first embodiment of the present disclosure. The light-emitting device 10A is also referred to as a phosphor wheel (phosphor wheel 10). The light-emitting device 10A is used as, for example, a light-emitting device that configures a light source optical system (for example, light source unit 1) of a later-described projection display apparatus (projector 100) (for example, refer to FIGS. 4 and 11). The light-emitting device 10A of the present embodiment is configured such that a part between bases including a pair of thin plates (a supporting base 11 and a sealing base 13) is filled with a plurality of phosphor particles 151. The pair of thin plate bases has, for example, a circular planar shape, and is disposed to face each other with a predetermined space being provided. It is to be noted that FIGS. 1, 3A, and 3B schematically illustrate a configuration of the light-emitting device 10A, and thus, may differ from an actual dimension or shape thereof.

(1-1. Configuration of Light-Emitting Device)

The light-emitting device 10A includes a configuration in which, on a surface (surface S1) of the supporting base 11, a reflection layer 12, a phosphor layer 15, and a sealing base 13 are stacked in this order, for example. The supporting base 11 and the sealing base 13 each have a circular shape, for example. The phosphor layer 15 including the plurality of phosphor particles 151 is formed in an annular shape, for example, on the supporting base 11 (for example, refer to FIG. 3A). A pair of spacers 14 is disposed on both ends of the phosphor layer 15. The pair of spacers 14 seals, between the supporting base 11 and the sealing base 13, the plurality of phosphor particles 151 configuring the phosphor layer 15. The pair of spacers 14 maintains a space between the supporting base 11 and the sealing base 13.

The supporting base 11 serves as a substrate that supports the reflection layer 12 and the phosphor layer 15. The supporting base 11 also serves as a heat dissipation member. The supporting base 11 includes an inorganic material such as a metal material and a ceramic material. As a constituent material of the supporting base 11, a material having high thermal conductivity and superior affinity to the reflection layer 12 is preferable. Specifically, examples of a metal material configuring the supporting base 11 include simple substances of metal such as Aluminum (Al), Copper (Cu), molybdenum (Mo), tungsten (W), cobalt (Co), chromium (Cr), platinum (Pt), tantalum (Ta), lithium (Li), zirconium (Zr), ruthenium (Ru), rhodium (Rh), and palladium (Pd), and alloys containing one or more kinds thereof. Alternatively, it is also possible to use, as a metal material that configures the supporting base 11, alloys such as CuW in which the content of W is 80 atom % or higher and CuMo in which the content of Mo is 40 atom % or higher. Examples of a ceramics material include, for example, silicon carbide (SiC), aluminum nitride (AlN), beryllium oxide (BeO), a composite material of Si and SiC, or a composite material of SiC and Al (where the composite material has the content of SiC of 50% or higher). Further, quartz or glass may be also used besides crystalline materials such as simple-substance Si, SiC, diamond, and sapphire. Of these, for the supporting base 11, the simple substances Mo, Si, and W are preferable as a constituent element. This is because these substances have high thermal conductivity.

The reflection layer 12 is formed on the surface S1 of the supporting base 11. The thickness of the reflection layer 12 is no less than 100 nm and no greater than 2000 nm, for example. The reflection layer 12 is formed by a metal film, etc. that contains a metal element such as aluminum (Al), silver (Ag), or titanium (Ti), in addition to a dielectric multilayer film, for example. The reflection layer 12 reflects excitation light EL (for example, laser light) applied from the outside and fluorescence FL derived from the phosphor layer 15. Therefore, the reflection layer 12 so functions as to improve the light emission efficiency in the light-emitting device 10A. It is to be noted that the reflection layer 12 may be omitted appropriately in a case where the supporting base 11 is formed by a material having light reflectivity.

The sealing base 13 retains, on the supporting base 11, the phosphor particles 151 that configure the phosphor layer 15. The sealing base 13 includes a material having light transmissivity. The sealing base 13 has a property of allowing the excitation light EL and the fluorescence FL that is converted by the phosphor particles 151 to be transmitted. Examples of a constituent material of the sealing base 13 include quartz, glass, sapphire, crystal, or YAG. In addition to these materials, in a case where a light source having low output in the later-described light source unit 1 is used, a resin material such as polyethylene terephthalate (PET) and silicone resin may be used.

As described above, the spacers 14 seal the phosphor particles 151 between the supporting base 11 and the sealing base 13, and maintain the space between the supporting base 11 and the sealing base 13. Examples of a constituent material of the spacer 14 include stainless steel, aluminum (Al), silicone, and polyimide. The height of the spacer 14 in the Y-axis direction, i.e. the space W between the supporting base 11 and the sealing base 13, depends on the particle diameter of the phosphor particles 151 used for the phosphor layer 15, and is preferably no greater than double of the average particle diameter of the phosphor particles 151. Specifically, the space W is preferably no less than 20 µm and no greater than 80 µm, for example. With such a configuration, occurrence of a deviation of the phosphor particles 151 in a space X that is formed by the supporting base 11, the sealing base 13, and the pair of spacers 14 is reduced. It is to be noted that an example in which the spacers 14 are disposed at the both ends of the phosphor layer 15 is illustrated in FIG. 1. However, this is non-limiting. For example, the spacers 14 may be appropriately disposed inside the phosphor layer 15.

The phosphor layer 15 is formed on the supporting base 11 with the reflection layer 12 provided therebetween. The phosphor layer 15 includes the phosphor particles 151. The phosphor layer 15 is formed by filling, with the plurality of phosphor particles 151, the space X that is formed by the supporting base 11, the sealing base 13, and the pair of spacers 14. The phosphor particles 151 are particulate phosphors that absorb excitation light EL (for example, laser light) applied from the outside and outputs fluorescence FL. For example, the phosphor particles 151 include a fluorescent substance that is excited by blue color laser light having a wavelength of a blue color wavelength region (for example, 400 nm to 470 nm) and outputs yellow color fluorescence (light having a wavelength region between a red color wavelength region and a green color wavelength region). For example, a YAG (Yttrium-Aluminum-Garnet)-based material is used as such a fluorescent substance. The average particle diameter ($W_1$) of the phosphor particles 151 is preferably no less than 1 µm and no greater than 100 µm, for example, and is more preferably no less than 20 µm and no greater than 40 µm.

In the phosphor layer 15 of the present embodiment, a porosity of the space X that is formed by the supporting base 11, the sealing base 13, and the pair of spacers 14 is preferably no less than 25% and no greater than 60%. Such an above-described porosity makes it possible to improve light emission efficiency as a light source. It is possible to adjust the porosity by using a plurality of phosphor particles having different average particle diameters.

The film thickness (hereinafter, simply referred to as thickness) of the phosphor layer 15 in the Y-axis direction also depends on the particle diameter of the phosphor particles 151 and conversion efficiency to fluorescence; however, it is preferably thinner as much as possible. If the phosphor layer 15 is thicker and the plurality of phosphor particles 151 overlap in the Y-axis direction, the light emission efficiency as a light source is reduced. Therefore, as illustrated in FIG. 1, for example, the phosphor layer 15 preferably includes a two-layer structure having a first layer 15A and a second layer 15B, where the first layer 15A is formed such that the plurality of phosphor particles 151 are disposed on the supporting base 11 so as not to overlap with each other in the Y-axis direction, and the second layer 15B is formed such that phosphor particles 151 are disposed at the respective recesses provided in the first layer 15A. Alternatively, as in a light-emitting device 10B, as illustrated in FIG. 2, for example, the phosphor layer 15 preferably includes a single-particle layer in which a certain single phosphor particle 151 is surrounded by other phosphor particles 151 only in the plane direction (the X-axis direction).

(1-2. Configuration of Phosphor Wheel)

The light-emitting device 10A is also referred to as a phosphor wheel as described above. The light-emitting device 10A is used as, for example, a light-emitting device of the light source unit 1 that configures the projector 100. FIG. 3A illustrates a planar configuration of the light-emitting device 10A as the phosphor wheel 10. FIG. 3B illustrates a cross-sectional configuration taken along the line I-I in FIG. 3A.

In the phosphor wheel 10, the phosphor layer 15 is provided between the circular (disk-shaped) supporting base 11 and the sealing base 13 such that the phosphor layer 15 is formed annularly, for example, at a peripheral edge of the supporting base 11 around the center O of the supporting base 11 and the sealing base 13. The phosphor wheel 10 is rotatably supported by a rotary shaft J16A. The phosphor wheel 10 rotates around the rotary shaft J16A as its rotation center at the time of the operation of the light source unit 1. The diameter of the phosphor wheel 10 (specifically, the diameter of the supporting base 11, for example) is about 50 mm to 70 mm, for example. A motor 16 causes the phosphor wheel 10 to rotate at the rotation speed of 2400 rpm to 10800 rpm, for example. A reason for causing the phosphor wheel 10 to rotate in this way is to suppress local temperature rise due to the irradiation with the excitation light EL, to maintain the structural stability, and to prevent the reduction in light conversion efficiency.

(1-3. Configuration of Light Source Unit)

FIG. 4 illustrates an entire configuration of the light source unit 1 including the light-emitting device 10A illustrated in FIGS. 1, 3A, and 3B (or the light-emitting device 10B illustrated in FIG. 2).

The light source unit 1 includes the light-emitting device 10A as a phosphor wheel, a light source section 62 that emits excitation light or laser light, lenses 63 to 66, a dichroic mirror 67, a reflection mirror 68, and a diffusion plate 69. The light-emitting device 10A (the phosphor wheel 10) is rotatably supported by the rotary shaft J16A. The diffusion plate 69 is rotatably supported by a shaft J69. The light source section 62 includes a first laser group 62A and a second laser group 62B. The first laser group 62A includes a plurality of semiconductor laser elements 621A that are arranged to oscillate excitation light (for example, a wavelength of 445 nm or 455 nm). The second laser group 62B includes a plurality of semiconductor laser elements 621B that are arranged to oscillate blue color laser light (for example, a wavelength of 465 nm). Here, for convenience, the excitation light oscillated from the first laser group 62A is referred to as ELL The blue color laser light (hereinafter, simply referred to as blue color light) oscillated from the second laser group 62B is referred to as EL2.

The light-emitting device 10A is disposed such that the excitation light EL1, which is transmitted through, in order, the lens 63, the dichroic mirror 67, and the lens 64, from the first laser group 62A, is caused to enter the phosphor layer 15. The fluorescence FL that is converted in the phosphor layer 15 is reflected at the reflection layer 12 toward the light source section 62 side, and reflected by the dichroic mirror 67 in the direction of the lens 65. The fluorescence FL reflected by the dichroic mirror 67 is transmitted through the lens 65 and travels toward the outside, i.e. toward the illumination optical system 2 (refer to FIG. 11).

The diffusion plate 69 diffuses the laser light EL2 that has travelled the reflection mirror 68 from the second laser group 62B. The laser light EL2 diffused at the diffusion plate 69 is transmitted through the lens 66 and the dichroic mirror 67, following which the diffused laser light EL2, together with the fluorescence FL, is transmitted through the lens 65 and travels toward the outside, i.e. toward the illumination optical system 2.

It is to be noted that, a cooling fan is desirably provided in the light source unit 1 in order to cool heat generated in the phosphor layer 15 due to the irradiation with the excitation light EL1 and the laser light EL2. It is also to be noted that the arrangement of each member configuring the light source unit 1 is not limited to the configuration illustrated in FIG. 4.

(1-4. Workings and Effects)

As described above, in the light source unit adopting solid-state light-emitting devices such as the LEDs or the LDs as light sources, the light-emitting devices are used which extract white color light as fluorescence by phosphors (phosphor particles) being irradiated with the light derived from the LEDs or the LDs. Of these light-emitting devices, in a so-called reflection type light-emitting device in which a reflection layer is provided between the supporting base and the phosphor layer, the excitation light applied from the outside or the fluorescence derived from the phosphor particles is reflected at the reflection layer, thereby improving light emission efficiency.

In such a light-emitting device, the phosphor layer is, in general, formed by being mixed with a binder, in order to fix the phosphor particles on a substrate. However, the phosphor particles that are mixed with the binder have low filling rate of the phosphor particles per unit volume, and further, it is difficult to shorten the distance between particles due to the binder existing between the particles. Therefore, it is difficult to improve light conversion efficiency. Furthermore, in such a phosphor layer, the fluorescence that is converted by the phosphor particles has a large amount of light propagation in a surface direction, and the area of emitting light with respect to the area of being irradiated with the excitation light becomes large, which leads to the reduction in light use efficiency in a projection display apparatus, for example. Furthermore, the fluorescence that has been outputted from the phosphor particles is absorbed in the binder upon going through the binder. Due to this, the light intensity that directed to outputting of light to the outside is deteriorated, and the light emission efficiency as a light source is reduced.

As a method to solve this issue, as described above, a method is considered in which phosphor particles are fixed on a substrate with a small amount of binders to thereby allow a portion of the phosphor particles to be exposed from the binder, thereby reducing the fluorescence that is propagated in the surface direction of the phosphor layer to improve the efficiency of extraction. However, so long as a binder is used, it is difficult to exclude the binder between the particles. Accordingly, it is difficult to increase the filling rate of the phosphor particles per unit volume, to no less than a predetermined rate. Further, if the amount of the binder is reduced in order to improve the efficiency of the extraction, the binding force between the phosphor particles or between the phosphor particles and the substrate is reduced, which causes the detachment of the phosphor particles to be likely to occur.

To the contrary, in the present embodiment, the phosphor layer 15 is formed such that the sealing base 13 is disposed on the supporting base 11 to face each other with a predetermined space being maintained, and a part between the supporting base 11 and the sealing base 13 is filled with the plurality of phosphor particles 151. This improves the filling rate of the phosphor particles 151 in the phosphor layer 15. Further, without using any binder, gaps are formed between the phosphor particles 151 that configure the phosphor layer 15, and a lot of pieces of light are diffused at the interface between the phosphor particles 151 and the air, and extracted to the light source section 62 side, before the fluorescence being propagated in the surface direction of the phosphor layer 15. Further, fluorescence loss due to the propagation of the fluorescence in the binder is eliminated, which improves fluorescence use efficiency and suppresses the expansion of the area of emitting light with respect to the area of being irradiated with the excitation light EL1. Accordingly, it is possible to improve the light conversion efficiency from the excitation light EL to the fluorescence FL. It is to be noted that the light conversion efficiency referred to as here means the ratio of the energy of the fluorescence FL to the energy of the excitation light EL, where the fluorescence FL is outputted from the phosphor layer 15 by the irradiation with the excitation light EL, and the excitation light EL is applied to the light-emitting devices 10A and 10B.

Further, in the present embodiment, the phosphor layer 15 is provided between the supporting base 11 and the sealing base 13. In other words, the phosphor layer 15 is retained on the supporting base 11 by the sealing base 13, which makes it possible to prevent the detachment of the phosphor particles 151. Accordingly, it is possible to improve reliability of the light-emitting devices 10A and 10B.

Furthermore, in the present embodiment, the spacers 14 are disposed between the supporting base 11 and the sealing base 13. Therefore, it is possible to prevent the supporting base 11 or the sealing base 13 from being deformed due to the influence of heat, etc. generated when used. Therefore, it is possible to suppress the deviation of the phosphor particles 151 due to the variation of the space between the supporting base 11 and the sealing base 13 (variation in thickness of the phosphor layer 15). Accordingly, it is possible to prevent the variation or reduction of the fluorescence use efficiency, a result of which it is possible to further improve the reliability of the light-emitting device 10A.

Furthermore, in the present embodiment, the porosity in the space X that is formed by the supporting base 11, the sealing base 13, and the pair of spacers 14 is set to no less than 25% and no greater than 60%. This makes it possible to restrain the reduction in light use efficiency in a case where the light-emitting devices 10A and 10B are used as, for example, an optical unit of the projection display apparatus or an illumination unit. It is to be noted that the light use efficiency referred to as here means the rate of an amount of light emitted by the projector 100 (brightness of an image projected), for example.

2. SECOND EMBODIMENT

FIG. 5 illustrates a cross-sectional configuration of a light-emitting device (light-emitting device 20A) according to the second embodiment of the present disclosure. Similarly to the above-described first embodiment, in the light-emitting device 20A, a phosphor layer 25 having phosphor particles 251 is provided between the supporting base 11 and the sealing base 13. The present embodiment includes a configuration in which surfaces of the phosphor particles 251 are each covered by an optical thin film 252. It is to be noted that FIG. 5 schematically illustrates a configuration of the light-emitting device 20A, and may differ from an actual dimension or shape thereof.

The optical thin film 252 includes, for example, a plurality of dielectric films having different refractive indices to each other, in a stacked manner. Examples of a material that configures the optical thin film 252 include inorganic dielectric materials such as a silicic acid compound, $SiO_2$, $TiO_2$, $Al_2O_3$, $Ta_2O_5$, $Nb_2O_5$, and $MgF_2$. Further, the material that configures the optical thin film 252 is not limited to inorganic dielectric materials, and organic dielectric materials may also be used. For example, the optical thin film 252 in the present embodiment is formed such that the above-described dielectric materials are stacked in the order from a material having a higher refractive index, from the phosphor particles 251 side, or alternatively dielectric materials having a higher refractive index and a lower refractive index are stacked alternately. The thickness of the optical thin film 252 may be several ten nano meters, for example. It is possible to form the optical thin film 252 on the entire surface of the phosphor particles 251 by using a coating method (for example, a sol-gel method), for example. It is to be noted that the optical thin film 252 may be formed as a single-layer film. The light-emitting device 20A includes a similar configuration to those of the light-emitting devices 10A and 10B, excluding these points.

In general, many phosphor particles have high refractive indices. The excitation light EL is applied from an air layer. Therefore, when the excitation light EL enters the phosphor particles, a portion of the excitation light EL is reflected, with the influence from Fresnel reflection. To the contrary, in the present embodiment, the phosphor particles 251 are covered by the optical thin film 252. In this way, Fresnel reflection is suppressed, and thus, it is possible to cause more pieces of the excitation light EL to enter the phosphor particles 251. Accordingly, in addition to the effects in the above-described first embodiment, an effect of making it possible to improve the light emission efficiency of the light-emitting device 20A is achieved.

3. MODIFICATION EXAMPLE 1

FIG. 6 illustrates a cross-sectional configuration of a light-emitting device (light-emitting device 20B) as a modification example according to the above-described second embodiment. Similarly to the above-described first embodiment, in the light-emitting device 20B, the phosphor layer 25 including the phosphor particles 251 is provided between the supporting base 11 and the sealing base 13. The present modification example includes a configuration in which surfaces of the phosphor particles 251 are each covered by a crosslinking film 253. It is to be noted that FIG. 6 schematically illustrates a configuration of the light-emitting device 20B, and may differ from an actual dimension or shape thereof.

The crosslinking film 253 includes, for example, glass that is synthesized with orthosilicic acid tetraalkyl (such as orthosilicic acid tetramethyl (TMOS) and orthosilicic acid tetraethyl (TEOS)) or waterglass (sodium silicate or silicic acidpotassium), as a raw material. The thickness of the crosslinking film 253 may be no greater than several hundred nano meters, and may be, for example, no greater than 200 nm. It is possible to form the crosslinking film 253 on the entire surface of the phosphor particle 251 by using an application method such as a sol-gel method, a precipitation method, a spin coating method, and printing. The light-emitting device 20B includes a similar configuration to that of the light-emitting device 20A, excluding these points.

As described above, in the present modification example, glass that is generally used as a binder is used as a film of the phosphor particles 151. With such a configuration, gaps are formed between the phosphor particles 151 in the phosphor layer 15. This makes it possible to suppress the propagation of the fluorescence in the surface direction of the phosphor layer 15. Accordingly, the expansion of the area of emitting light with respect to the area of being irradiated with the excitation light EL1 is suppressed, which makes it possible to improve the light conversion efficiency from the excitation light EL to the fluorescence FL.

4. THIRD EMBODIMENT

FIG. 7 illustrates a cross-sectional configuration of a light-emitting device (light-emitting device 30) according to the third embodiment of the present disclosure. Similarly to the above-described first embodiment, in the light-emitting device 30, the phosphor layer 35 including the phosphor particles 351 is provided between the supporting base 11 and the sealing base 13. The present embodiment includes a configuration in which metal nano particles 353 are provided on surfaces of the phosphor particles 351. It is to be noted that FIG. 7 schematically illustrates a configuration of the light-emitting device 30, and may differ from an actual dimension or shape thereof.

The metal nano particles 353 are metal particles having the average particle diameter of no greater than 100 nm. For the metal nano particles 353, gold (Au), silver (Ag), or the like is preferably used. It is possible, for example, to cause the metal nano particles 353 to be attached to the surfaces of the phosphor particles 251 by intermolecular force, or it is possible to provide the metal nano particles 353 on the surfaces of the phosphor particles 351 by mixing upon forming the optical thin films 252 on the surfaces of the phosphor particles 251.

In the present embodiment, by providing the metal nano particles 353 on the surfaces of the phosphor particles 351, an effect of making it possible to improve the light emission efficiency of the phosphor particles 351 owing to a surface plasmon effect by the metal nano particles 353 is achieved, in addition to the effect of the above-described first embodiment.

It is to be noted that, in the light-emitting device (for example, the light-emitting device 30) of the present disclosure, the phosphor layer (for example, the phosphor layer 35) is formed by being filled with the plurality of phosphor particles 351, without any binder, between the supporting base 11 and the sealing base 13, which improves the filling rate of the phosphor particles 351 in the phosphor layer 35. Therefore, the distances between the phosphor particles 351 are close, and thus, it is possible to give an effect derived from a single metal nano particle 353 to a plurality of phosphor particles. Accordingly, it is possible to efficiently improve the light emission efficiency of the light-emitting device 30.

5. FOURTH EMBODIMENT

FIGS. 8A and 8B illustrate a cross-sectional configuration of a light-emitting device (light-emitting devices 40A and 40B) according to a fourth embodiment of the present disclosure. Similarly to the above-described first embodiment, in the light-emitting devices 40A and 40B, a phosphor layer 45 having phosphor particles 451 is provided between the supporting base 11 and the sealing base 13. The present embodiment differs from the above-described first to third embodiments in that a nano phosphor layer 46 including nano phosphor particles 454 is disposed between the phosphor layer 45 and the sealing base 13 (FIG. 8A) or between the phosphor layer 45 and the supporting base 11 (FIG. 8B). It is to be noted that FIGS. 8A and 8B schematically illustrate configurations of the light-emitting devices 40A and 40B, and may differ from an actual dimension or shape thereof.

The nano phosphor layer 46 includes phosphor particles (nano phosphor particles 454) having the average particle diameter of no greater than 100 nm. The nano phosphor particles 454 have a different light emission spectrum from that of the phosphor particles 451. As illustrated in FIGS. 8A and 8B, the nano phosphor layer 46 may be provided between the phosphor layer 45 including the phosphor particles 451 and the sealing base 13 or between the phosphor layer 45 and the supporting base 11. However, the nano phosphor layer 46 is preferably provided on the side which the excitation light EL enters. For example, it is possible to form the nano phosphor layer 46 by causing the nano phosphor particles 454 to be attached on the surface of the sealing base 13 or the supporting base 11 (here, the reflection layer 12) by intermolecular force. In addition, the nano phosphor layer 46 may be formed by applying a resin mixed with the nano phosphor particles 454 to the surface of the sealing base 13 or the supporting base 11 (here, reflection layer 12). It is to be noted that the nano phosphor layer 46 may be provided between the phosphor layer 45 and the sealing base 13, between the phosphor layer 45 and the base 11, or both. Alternatively, similarly to the above-described metal nano particles 353, the nano phosphor layer 46 may be attached to the surface of the phosphor particles 451.

In the present embodiment, the nano phosphor layer 46 including the nano phosphor particles 454 having a different light emission spectrum from that of the phosphor particles 451 is disposed between the phosphor layer 45 including the phosphor particles 451 and the sealing base 13 or the supporting base 11. With such a configuration, in addition to the above-described first embodiment, use efficiency of the excitation light EL is improved, and thus, an effect of making it possible to further improve the light conversion efficiency of the light-emitting devices 40A and 40B is achieved.

Specifically, in a case where a Ce: YAG-based phosphor material is used as the phosphor particles 451, for example, the Ce: YAG-based phosphor material has a light emission spectrum from a wavelength of green color to a wavelength of red color; however, the wavelength component of red color is relatively lower than the wavelength component of green color. At this time, the wavelength component of red color becomes high by using, as the nano phosphor particles 454, a phosphor material having the light emission peak in the wavelength region of red color. In this way, by forming the nano phosphor layer 46 with use of a phosphor material having a desired light emission peak, for example, in a case of using such a nano phosphor layer 46 as a light source optical system (the light source unit 1) of a later-described projector 100, it becomes possible to improve the light conversion efficiency from the excitation light EL to the fluorescence FL.

6. MODIFICATION EXAMPLE 2

FIG. 9 illustrates a cross-sectional configuration of a light-emitting device 50 as a modification example (modification example 2) of the above-described first to fourth embodiments and modification example 1. In the light-emitting device 50, the phosphor layer 15 is formed on a surface (surface S1) of a supporting base 51. The light-emitting device 50 of the present modification example is different from the light-emitting device 10A, etc. in the above-described first to fourth embodiments and modification example 1, and is a so-called transmissive light-emitting device. It is to be noted that FIG. 9 schematically illustrates a configuration of the light-emitting device 50, and may differ from an actual dimension or shape thereof.

The supporting base 51 includes a material having light transmissivity, and has a property of transmitting the excitation light EL with which a back surface (surface S2), which is located opposite to the surface S1, is irradiated. Examples of a constituent material of the supporting base 51 include quartz, glass, sapphire, crystal, or YAG. Further, the dichroic mirror 67 that transmits the excitation light EL and reflects the fluorescence FL may be provided on the surface S1 to thereby improve the light emission efficiency of the light-emitting device 50. The light-emitting device 50 includes a similar configuration to that of the light-emitting device 10A, excluding these points.

FIG. 10 illustrates an example of a positional relationship between the light-emitting device 50 of the present modification example and other members in a case of using the light-emitting device 50 of the present modification example as a light-emitting device of the light source unit 1 that configures the projector 100, for example. In a case of using the transmissive light-emitting device 50 (phosphor wheel), the light source section 62, the phosphor layer 15 of the light-emitting device 50, and a collimator lens 71 are disposed, in this order, on an optical path A of the excitation light EL applied from the light source section 62, for example. The fluorescence FL outputted from the phosphor layer 15 is transmitted through the collimator lens 71 and travels toward the illumination optical system 2.

In the light-emitting device 50 in the present modification example, for example, when the excitation light EL such as laser light is transmitted through the sealing base 13, for example, and applied to the phosphor layer 15, each of the phosphor particles 151 is excited, and the fluorescence FL having a different wavelength from that of the excitation light EL is outputted from each of the phosphor particles 151 toward the supporting base 11 side. A similar effect to that of the light-emitting device 10A, etc. of the above-described embodiments is obtained also in such a light-emitting device 50.

Further, the light-emitting device 10B is described in which the phosphor layer 15 is provided as a single-particle layer of the phosphor particles 151 in the first embodiment. However, regarding the effect of forming the phosphor layer 15 as a single-particle layer, a high effect is obtained in a transmissive light-emitting device, as in the light-emitting device 50 of the present modification example. Specifically, in a case of using the transmissive light-emitting device as a light source optical system (the light source unit 1) of the projector 100, the excitation light EL that is emitted from a light source such as an LED or an LD is partially absorbed by the phosphor particles, for example, subjected to wavelength conversion to be converted into blue color light (the fluorescence FL), and synthesized with the excitation light EL that has not been absorbed by the phosphor particles, to be converted into white color light. At this time, if a plurality of phosphor particles have been stacked in the phosphor layer, a lot of pieces of the excitation light EL are absorbed by the phosphor particles.

It is to be noted that, in FIG. 9, a configuration of the transmissive light-emitting device has been described with the drawing corresponding to the light-emitting device 10A in the first embodiment. However, the configuration of the transmissive light-emitting device is applicable to any of the light-emitting devices 20A, 20B, 30, 40A, and 40B in the respective second to fourth embodiments and modification example 1.

7. APPLICATION EXAMPLES

Next, with reference to FIGS. 11 and 12, description is given of a projection display apparatus (projectors 100 or 200) including the light source unit 1 having the light-emitting device 10A (or the light-emitting devices 10B, 20A, 20B, 30, 40A, 40B, and 50). FIG. 11 exemplifies a reflection-type-3LCD-system projector (the projector 100) that performs light modulation by a reflection type liquid crystal panel (LCD). FIG. 12 exemplifies a reflection-type-3LCD-system projector (the projector 200) that performs light modulation by a transmissive liquid crystal panel (LCD). It is to be noted that the projection display apparatus of the present disclosure is applicable to a projector using, for example, a digital micro-mirror device (DMD: Digital Micro-Mirror Device), or the like, in place of a reflection type liquid crystal panel and a transmissive liquid crystal panel.

Application Example 1

FIG. 11 illustrates a configuration example of a reflection-type-3LCD-system projector 100 that performs light modulation by a reflection type liquid crystal panel (LCD). For example, the projector 100 includes, in order, the light source unit 1 (the light source optical system) that has been described in the above-described first embodiment, the illumination optical system 2, an image forming section 3 (an image generation optical system), and a projection optical system 4 (a projection optical system).

The illumination optical system 2 includes, for example, from a position close to the light source unit 1, fly-eye lenses 210 (210A and 210B), a polarization conversion element 220, a lens 230, dichroic mirrors 240A and 240B, reflection mirrors 250A and 250B, lenses 260A and 260B, a dichroic mirror 270, and polarizing plates 280A to 280C.

The fly-eye lenses 210 (210A and 210B) allow for uniformity of an illuminance distribution of white color light derived from the lens 65 of the light source unit 1. The polarization conversion element 220 so functions as to arrange a polarization axis of incident light in a predetermined direction. For example, the polarization conversion element 220 converts light other than P-polarized light into the P-polarized light. The lens 230 condenses light derived from the polarization conversion element 220 toward the dichroic mirrors 240A and 240B. The dichroic mirrors 240A and 240B selectively reflect light of a predetermined wavelength region and cause light of wavelength regions other than the light of a predetermined wavelength region to be transmitted therethrough selectively. For example, the dichroic mirror 240A reflects mainly red color light in a direction of the reflection mirror 250A. In addition, the dichroic mirror 240B reflects mainly blue color light in a direction of the reflection mirror 250B. Accordingly, mainly green color light is transmitted through both of the dichroic mirrors 240A and 240B and travels toward a reflection type polarizing plate 310C (described later) of the image forming section 3. The reflection mirror 250A reflects light (mainly the red color light) derived from the dichroic mirror 240A toward the lens 260A and the reflection mirror 250B reflects light (mainly the blue color light) derived from the dichroic mirror 240B toward the lens 260B. The lens 260A causes light (mainly, the red color light) derived from the reflection mirror 250A to be transmitted therethrough and condenses the light to the dichroic mirror 270. The lens 260B causes light (mainly the blue color light) derived from the reflection mirror 250B to be transmitted therethrough, and condenses the light to the dichroic mirror 270. The dichroic mirror 270 selectively reflects the green color light and causes light of wavelength regions other than the green color light to be transmitted therethrough selectively. Here, the dichroic mirror 270 causes a red color light component in the light derived from the lens 260A to be transmitted therethrough. In a case where a green color light component is contained in the light derived from the lens 260A, the dichroic mirror 270 reflects the green color light component toward the polarizing plate 280C. The polarizing plates 280A to 280C include polarizers each having a polarization axis in a predetermined direction. For example, in a case where light is converted into P-polarized light by the polarization conversion element 220, the polarizing plates 280A to 280C cause the P-polarized light to be transmitted therethrough and reflect S-polarized light.

The image forming section 3 includes reflection type polarizing plates 310A to 310C, reflection type liquid crystal panels 320A to 320C, and a dichroic prism 330.

The reflection type polarizing plates 310A to 310C each cause light (for example, the P-polarized light) of a polarization axis that is the same as the polarization axis of the polarized light derived from each of the polarizing plates 280A to 280C to be transmitted therethrough, and reflect light (the S-polarized light) of polarization axes other than the P-polarized light. Specifically, the reflection type polarizing plate 310A causes red color light of the P-polarized light derived from the polarizing plate 280A to be transmitted in a direction of the reflection type liquid crystal panel 320A. The reflection type polarizing plate 310B causes blue color light of the P-polarized light derived from the polarizing plate 280B to be transmitted in a direction of the reflection type liquid crystal panel 320B. The reflection type polarizing plate 310C causes green color light of the P-polarized light derived from the polarizing plate 280C to be transmitted in a direction of the reflection type liquid crystal panel 320C. In addition, the green color light of the P-polarized light that has been transmitted through both of the dichroic mirrors 240A and 240B and has entered the reflection type polarizing plate 310C is transmitted through the reflection type polarizing plate 310C and enters the dichroic prism 330 as it is. Further, the reflection type polarizing plate 310A reflects the red color light of the S-polarized light derived from the reflection type liquid crystal panel 320A and makes the light enter the dichroic prism 330. The reflection type polarizing plate 310B reflects the blue color light of the S-polarized light derived from the reflection type liquid crystal panel 320B and makes the light enter the dichroic prism 330. The reflection type polarizing plate 310C reflects the green color light of the S-polarized light derived from the reflection type liquid crystal panel 320C and makes the light enter the dichroic prism 330.

The reflection type liquid crystal panels 320A to 320C perform spatial modulation of the red color light, the blue color light, and the green color light, respectively.

The dichroic prism 330 synthesizes together the entered red color light, blue color light, and green color light, and outputs synthesized light toward the projection optical system 4.

The projection optical system 4 includes lenses L410 to L450 and a mirror M400. The projection optical system 4 enlarges outgoing light derived from the image forming section 3, and projects the light onto, for example, a screen (not illustrated).

(Operations of Light Source Unit and Projector)

Next, description is given of an operation of the projector 100 including the light source unit 1 with reference to FIGS. 4 and 11.

First, in the light source unit 1, the motors 16 and 70 are driven to rotate the light emitting device 10A and the diffusion plate 69. Thereafter, the excitation light EL1 that is the blue color light is oscillated from the first laser group 62A at the light source section 62, and the laser light EL2 that is also the blue color light is oscillated from the second laser group 62B at the light source section 62.

The excitation light EL1 is oscillated from the first laser group 62A, following which the excitation light EL1 is transmitted through the lens 63, the dichroic mirror 67, and the lens 64, in order. Thereafter, the excitation light EL1 is applied to the phosphor layer 15 of the light-emitting device 10A. The phosphor layer 15 of the light emitting device 10A partially absorbs the excitation light EL1, thus converting the absorbed light into the fluorescence FL1, which is yellow color light, and emitting the fluorescence FL1 toward the lens 64. The fluorescence FL1 is reflected by the dichroic mirror 67, following which the fluorescence FL1 is transmitted through the lens 65 and travels toward the illumination optical system 2. On this occasion, the reflection layer 12 of the light emitting device 10A causes the remaining excitation light EL1 that has not been absorbed by the phosphor layer 15 to be reflected toward the lens 64. The excitation light EL1 that has been reflected by the reflection layer 12 of the light emitting device 10A is also reflected by the dichroic mirror 67, and thereafter, transmitted through the lens 65 and travels toward the illumination optical system 2.

The laser light EL2 is oscillated from the second laser group 62B, travels via the reflection mirror 68, and thereafter, is applied to the diffusion plate 69. The diffusion plate 69 diffuses the laser light EL2, and outputs the diffused light toward the lens 66. The laser light EL2 is transmitted through the dichroic mirror 67, following which the light is transmitted through the lens 65 and travels toward the illumination optical system 2.

In this way, the light source unit 1 synthesizes the fluorescence FL (FL1), which is the yellow color light, with the blue color laser light EL (EL2), and make resulting white color light enter the illumination optical system 2.

The white color light derived from the light source unit 1 is sequentially transmitted through the fly-eye lenses 210 (210A and 210B), the polarization conversion element 220, and the lens 230, and thereafter reaches the dichroic mirrors 240A and 240B.

Mainly the red color light R is reflected by the dichroic mirror 240A, and the red color light R is sequentially transmitted through the reflection mirror 250A, the lens 260A, the dichroic mirror 270, the polarizing plate 280A, and the reflection type polarizing plate 310A, and reaches the reflection type liquid crystal panel 320A. The red color light R is spatially modulated at the reflection type liquid crystal panel 320A, following which the spatially-modulated red color light R is reflected by the reflection type polarizing plate 310A and enters the dichroic prism 330. It is to be noted that, in a case where the green color light component is contained in the light that has been reflected by the dichroic mirror 240A to the reflection mirror 250A, the green color light component is reflected by the dichroic mirror 270 to be sequentially transmitted through the polarizing plate 280C and the reflection type polarizing plate 310C and reaches the reflection type liquid crystal panel 320C. Mainly the blue color light B is reflected by the dichroic mirror 240B and enters the dichroic prism 330 through a similar process. The green color light G that has been transmitted through the dichroic mirrors 240A and 240B also enters the dichroic prism 330.

The red color light R, the blue color light B, and the green color light G that have entered the dichroic prism 330 are synthesized together and thereafter outputted toward the projection optical system 4 as image light. The projection optical system 4 enlarges the image light derived from the image forming section 3 and projects the light onto, for example, the screen (not illustrated).

Application Example 2

FIG. 12 illustrates a configuration example of a transmissive 3LCD-system projector 200 that performs light modulation by a transmissive liquid crystal panel (LCD). For example, the projector 200 includes, in order, the light source unit 1 that has been described in the above-described first embodiment, an illumination optical system 5, an image forming section 6, and a projection optical system 7.

The illumination optical system 5 includes, for example, an integrator element 530, a polarization conversion element 540, and a condensing lens 550. The integrator element 530 includes a first fly-eye lens 531 having a plurality of micro-lenses that are arrayed two-dimensionally and a second fly-eye lens 532 having a plurality of micro-lenses that are arrayed in one-to-one correspondence with the respective micro-lenses thereof.

Light (parallel light) that enters the integrator element 530 from the light source unit 1 is divided by the micro-lenses of the first fly-eye lens 531 into the plurality of fluxes that are, thereafter, imaged on the corresponding micro-lenses of the second fly-eye lens 532. The respective micro-lenses of the second fly-eye lens 532 function as secondary light sources and irradiate the polarization conversion element 540 with a plurality of pieces of parallel light, as incident light, that are made uniform in luminance.

The integrator element 530 has a function of arranging the incident light, from the light source unit 1, with which the polarization conversion element 540 is irradiated so as to have a uniform luminance distribution as a whole.

The polarized conversion element 540 has a function of arranging a polarization state of the incident light that enters via the integrator element 530, etc. The polarization conversion element 540 outputs outgoing light that includes blue color light B, green color light G, and red color light R via, for example, the lens 65, etc. that is disposed on the output side of the light source unit 1.

The illumination optical system 5 further includes dichroic mirrors 560 and 570, mirrors 580, 590, and 600, relay lenses 610 and 620, field lenses 630R, 630G, and 630B, liquid crystal panels 510R, 510G, and 510B that serve as the image forming section 6, and a dichroic prism 640.

The dichroic mirrors 560 and 570 each have a property of selectively reflecting colored light of predetermined wavelength regions and transmitting light of wavelength regions other than the colored light of predetermined wavelength regions. For example, the dichroic mirror 560 selectively reflects the red color light R. The dichroic mirror 570 selectively reflects the green color light G between the green color light G and the blue color light B that have been transmitted through the dichroic mirror 560. The remaining blue color light B is transmitted through the dichroic mirror 570. With such a configuration, the light (white color light Lw) outputted from the light source unit 1 is separated into a plurality of pieces of colored light of different colors.

The separated red color light R is reflected by the mirror 580 and is made parallel by passing through the field lens 630R and, thereafter, enters the liquid crystal panel 510R that is for red color light modulation. The green color light G is made parallel by passing through the field lens 630G and, thereafter, enters the liquid crystal panel 510G that is for green color light modulation. The blue color light B passes through the relay lens 610 and is reflected by the mirror 590, then further passes through the relay lens 620 and is reflected by the mirror 600. The blue color light B that has been reflected by the mirror 600 is made parallel by passing through the field lens 630B and, thereafter, enters the liquid crystal panel 510B that is for modulation of the blue color light B.

The liquid crystal panels 510R, 510G, and 510B are electrically coupled to an unillustrated signal source (for example, a PC, etc.) that supplies image signals including image information. The liquid crystal panels 510R, 510G, and 510B modulate the incident light on a pixel-by-pixel basis, on the basis of the supplied image signals of respective colors, and generate a red color image, a green color image, and a blue color image. The pieces of modulated light of respective colors (the formed images) enter the dichroic prism 640 and are synthesized together. The dichroic prism 640 superposes and synthesizes together the pieces of light of respective colors that have entered from three directions and outputs synthesized light toward the projection optical system 7.

The projection optical system 7 includes a plurality of lenses 710, etc. and irradiates an unillustrated screen with the light synthesized by the dichroic prism 640. With such a configuration, a full-color image is displayed.

As described, the present disclosure has been described by way of the first to fourth embodiments and modification examples 1 and 2. However, the present disclosure is not limited to the above-described embodiments, etc., and may be variously modified. For example, the material of each layer, the thickness, and the like, that have been described in the above-described embodiments are merely an example, and not limited thereto, and thus, other materials and thicknesses may be adopted.

Further, as the projection display apparatus according to the present disclosure, an apparatus other than the above-described projector may be configured. Further, the light source unit according to the present disclosure may be used for an apparatus that is not a projection display apparatus. For example, the light source unit 1 of the present disclosure may be used as illumination applications, and is applicable to, for example, a headlight for a vehicle or a light source for illumination.

It is to be noted that the present technology may adopt the following configurations.

(1)

A light-emitting device including:

a first base;

a second base disposed to face the first base; and a phosphor layer filled with a plurality of phosphor particles between the first base and the second base.

(2)

The light-emitting device according to (1), in which the phosphor layer is a single-particle layer including the plurality of phosphor particles.

(3)

The light-emitting device according to (1) or (2), including a pair of spacers facing each other and provided between the first base and the second base, in which the phosphor layer is sealed by the pair of spacers.

(4)

The light-emitting device according to (3), in which a porosity of a space formed by the first base, the second base, and the pair of spacers is no less than 25% and no greater than 60%.

(5)

The light-emitting device according to any one of (1) to (4), in which the phosphor particles are covered by optical thin films.

(6)

The light-emitting device according to (5), in which the optical thin film includes at least one of a silicic acid compound, a silicon oxide, or a titanium oxide.

(7)

The light-emitting device according to any one of (1) to (6), in which the optical thin film includes a metal nano particle.

(8)

The light-emitting device according to any one of (1) to (7), in which the phosphor particle includes a surface having a metal nano particle.

(9)

The light-emitting device according to any one of (1) to (8), including a plurality of nano phosphor particles disposed between the phosphor layer and the first base, between the phosphor layer and the second base, or both.

(10)

The light-emitting device according to (9), in which the nano phosphor particle has a different light emission spectrum from the phosphor particles.

(11)

The light-emitting device according to any one of (1) to (10), in which the phosphor particle is covered by a crosslinking film including glass, and a gap is provided between the plurality of phosphor particles in the phosphor layer.

(12)

The light-emitting device according to any one of (1) to (11), in which the first base and the second base each are a disk-shaped substrate, and the phosphor layer is formed in an annular shape between the first base and the second base.

(13)

The light-emitting device according to any one of (1) to (12), in which at least one of the first base or the second base has light transmissivity.

(14)

The light-emitting device according to any one of (1) to (13), in which one of the first base and the second base has light reflectivity.

(15)
The light-emitting device according to any one of (1) to (14), including a reflection layer in one of the first base and the second base.

(16)
A light source unit including:
a light source section; and
a light-emitting device that is excited by light derived from the light source section and emits fluorescence, the light-emitting device including
a first base,
a second base that is disposed to face the first base, and
a phosphor layer that is provided to be filled with a plurality of phosphor particles between the first base and the second base.

(17)
A projection display apparatus including:
a light source optical system including a light-emitting device;
an image generation optical system that modulates light derived from the light source optical system on the basis of an inputted image signal, and thereby generates image light; and
a projection optical system that projects the image light that is generated at the image generation optical system,
the light-emitting device including
a first base,
a second base that is disposed to face the first base, and
a phosphor layer that is provided to be filled with a plurality of phosphor particles between the first base and the second base.

The present application is based on and claims priority from Japanese Patent Application No. 2016-068577 filed with the Japan Patent Office on Mar. 30, 2016, and Japanese Patent Application No. 2016-231371 filed with the Japan Patent Office on Nov. 29, 2016, the entire contents of which are hereby incorporated by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A light-emitting device, comprising:
a first base;
a second base that faces the first base;
a reflection layer on one of the first base or the second base;
a phosphor layer between the first base and the second base, wherein the phosphor layer includes a plurality of phosphor particles; and
a plurality of nano phosphor particles between a portion of the phosphor layer and the reflection layer.

2. The light-emitting device according to claim 1, wherein the phosphor layer comprises a single-particle layer including the plurality of phosphor particles.

3. The light-emitting device according to claim 1, further comprising a pair of spacers between the first base and the second base, wherein
the phosphor layer is sealed by the pair of spacers, and
a first spacer of the pair of spacers faces a second spacer of the pair of spacers.

4. The light-emitting device according to claim 3, wherein a porosity of a space between the first base, the second base, and the pair of spacers is in a range of 25% to 60%.

5. The light-emitting device according to claim 1, wherein each of the plurality of phosphor particles is covered by an optical thin film.

6. The light-emitting device according to claim 5, wherein the optical thin film includes at least one of a silicic acid compound, a silicon oxide, or a titanium oxide.

7. The light-emitting device according to claim 5, wherein the optical thin film includes a metal nano particle.

8. The light-emitting device according to claim 1, wherein a surface of each of the plurality of phosphor particles includes a plurality of metal nano particles.

9. The light-emitting device according to claim 1, wherein a light emission spectrum of the plurality of nano phosphor particles is different from a light emission spectrum of the plurality of phosphor particles.

10. The light-emitting device according to claim 1, wherein
each of the plurality of phosphor particles is covered by a crosslinking film including glass, and
the phosphor layer includes a plurality of gaps between the plurality of phosphor particles.

11. The light-emitting device according to claim 1, wherein
each of the first base and the second base is a disk-shaped substrate, and
the phosphor layer has an annular shape between the first base and the second base.

12. The light-emitting device according to claim 1, wherein at least one of the first base or the second base has light transmissivity.

13. The light-emitting device according to claim 1, wherein one of the first base or the second base has light reflectivity.

14. A light source unit, comprising:
a light source section configured to output light; and
a light-emitting device configured to emit fluorescence based on excitation by the light output from the light source section, wherein the light-emitting device includes:
a first base;
a second base that faces the first base;
a reflection layer on one of the first base or the second base;
a phosphor layer between the first base and the second base, wherein the phosphor layer includes a plurality of phosphor particles; and
a plurality of nano phosphor particles between a portion of the phosphor layer and the reflection layer.

15. A projection display apparatus, comprising:
a light source optical system including a light-emitting device, wherein the light source optical system is configured to output light;
an image generation optical system configured to:
modulate the light output from the light source optical system, wherein the light is modulated based on an inputted image signal; and
generate image light based on the modulated light; and
a projection optical system configured to project the generated image light, wherein
the light-emitting device includes:
a first base;
a second base that faces the first base;
a reflection layer on one of the first base or the second base;
a phosphor layer between the first base and the second base, wherein the phosphor layer includes a plurality of phosphor particles; and a plurality of nano phosphor particles between a portion of the phosphor layer and the reflection layer.

16. The light-emitting device according to claim 5, wherein the optical thin film includes a plurality of dielectric films, and a refractive index of a first dielectric film of the plurality of dielectric films is different from a refractive index of a second dielectric film of the plurality of dielectric films.

* * * * *